United States Patent
Du

(10) Patent No.: US 7,408,924 B2
(45) Date of Patent: Aug. 5, 2008

(54) VIDEO COMMUNICATION METHOD OF INTERNET PROTOCOL PHONE

(75) Inventor: Hung-Yeh Du, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 965 days.

(21) Appl. No.: 10/762,483

(22) Filed: Jan. 23, 2004

(65) Prior Publication Data

US 2005/0207355 A1  Sep. 22, 2005

(51) Int. Cl.
  *H04L 12/66* (2006.01)
(52) U.S. Cl. .................... 370/352; 370/431; 348/14.01; 348/14.03
(58) Field of Classification Search .............. None
See application file for complete search history.

(56) References Cited

U.S. PATENT DOCUMENTS

| | | | |
|---|---|---|---|
| 2002/0146000 A1* | 10/2002 | Jonsson et al. | 370/352 |
| 2003/0052962 A1* | 3/2003 | Wilk | 348/14.01 |
| 2003/0095560 A1* | 5/2003 | Arita et al. | 370/431 |
| 2004/0125789 A1* | 7/2004 | Parker et al. | 370/352 |
| 2005/0151833 A1* | 7/2005 | Cupal et al. | 348/14.01 |

* cited by examiner

*Primary Examiner*—Creighton H Smith
(74) *Attorney, Agent, or Firm*—Rabin & Berdo, P.C.

(57) ABSTRACT

A video signal communication method, applicable to IP phone, the method comprises of the following steps: when starting up the supporting video signal function, also starting to receive transmission using video related communication protocol; receiving the internet address setting of the video processing device to retrieve the internet address of the video processing device; determining if the video processing device is initialized; determining if the connected video processing device is initialized and then transmitting the received video signal to the video signal processing device; processing video signal via the compression/decompression module, and the video processing device displaying the video signal.

18 Claims, 3 Drawing Sheets

VIDEO COMMUNICATION METHOD OF INTERNET PROTOCOL PHONE

BACKGROUND OF THE INVENTION

1. Field of Invention

The present invention relates to a video signal communication method, applicable to an internet protocol phone, especially related to a method of adding a video communication to an internet protocol phone.

2. Related Art

Due to the popularity of broadband networks, the utilization of the internet has changed to long computer online connections. This change is not only applicable to computer users' work and usage, but also applies to the consumer's products. Due to the long online connection to the Internet, people are network neighbors and can communicate with each other using the Internet, therefore many internet related applications are produced, including Internet TV, Internet Stations, and IP phones. Recently, VoIP (voice over Internet Protocol) has been very popular in the Internet world; VoIP changed the communication model between people. VoIP is a technology using the internet as the transmission medium and transmit voice using an Internet Protocol address. The telephone using the VoIP protocol is called an Internet Protocol Phone (IP phone). Since the early internet transmission speed is limited, the voice of the opposite terminal using low resolution compression standard is not clear. And using a high resolution compression standard makes the files become large and the transmission rate is slow, the voice becomes discontinuously. Therefore it is not suitable for daily use. As broadband becomes popular and widespread, everyone has high speed network transmission, the voice sampling compression can be increased, and the quality can be increased close to the normal telephone. Not only apply for the voice, but sampling 1000 k/sec motion Real Player file images is also not a problem. Therefore the video system on internet is getting popular. The current IP phone has three different types: 1. computer to phone, 2. computer to computer, 3 phone to phone. The following explains these types. The computer to telephone type, using the normal computer and IP phone, can use ADSL or cable high speed network transmission. Usually, it requires application for an account number from the VoIP service company and the purchase of specific software to install on the computer, plus headsets and a microphone, through a VoIP service computer's switch, connected to the IP phone of the communication side. For the computer to computer version, we have in mind normal computer to computer users, with installed talking software, headsets and microphone, talking to each other. For example, an i-phone that has been introduced for a while now, or the MSN Messenger that's being used by many people, these are the original forms of IP phone. The phone to phone communication uses the switch technology and a stable network to form a phone to phone's loop. However, it is very costly, and needs to place server management, so it is the format used by privately owned internationally telephone companies. From the above description, it provides the current applications of internet phones. The IP phones with display devices and image recording devices are very expensive, so they are not affordable to every user for purchasing IP phones with a display device and an image recording device, and not every user can pay a simple, convenient, and reasonable price to enjoy video phone communication.

SUMMARY OF THE INVENTION

Combining the above descriptions, the invention provides a video communication method, applied to an IP phone, so the user can easily use an IP phone to achieve the goal of video communication.

According to the goal of the invention, a video communication method, applied to an IP phone, the method comprises the following steps: when starting up the supporting video signal function, receives a transmission using a video related communication protocol. receives the internet address setting of the video processing device to retrieve the internet address of the video processing device; receives a video signal from the communication terminal and uses the video processing device's internet address to verify if the video processing device is initialized. After having verified if the connected video processing device is initialized, the user transmits the received video signal to the video signal processing device; processes the video signal via the compression/decompression module, and displays the video signal using the video processing device. The video processing device receives the transmitted back video signal, through the compression/decompression module to process the signal, and the transmitted back video signal is transmitted through the network to the internet voice phone. The transmitted back video signal is combined with the transmitted back voice signal, and they are transmitted back to the communication terminal.

The invention, proposes a video communication method, applicable to comprise a communication system, an IP phone and a video processing unit. The IP phone comprises of: a internet address setting module, using the internet address of the video processing device and the internet address of the communication terminal retrieved from the telephone control module, and storing the internet address of the video processing device and the internet address of the communication terminal in the storage module. The network control module uses the internet address of the video processing device and the internet address of the communication terminal. This is to control and receive the external and internal area network data transmission between the internet voice phone and the voice processing device and the internet voice phone and the communication terminal. The internal area network includes, wired and wireless, the phone control module, used to control the communication process between the communication terminals. It includes controlling the voice playing module to play the communication's voice signal, and transmitting the communication's video signal to the video processing device for processing via the area network, and displaying on the video processing device. After receiving the transmitted back video and voice signals, they are combined to be transmitted using external network to the communication terminal. The video receiving module is used to receive the initializing video signal from the control module and initialize the IP phone's function to receive a video signal. The video processing device comprises of a control module, used to control the transmission and display of the video signal with the IP phone. It also controls the video signal's compression and decompression process, so the decompressed video signal is displayed on the video-processing device. A display module is also included, used to display the decompressed video signal on the video processing device. And finally, a compression/decompression module is used to decompress the video signal transmitted from the control module and to compress the transmitted back video signal received from the control module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given here in below illustration only, and thus is not limitative of the present invention, wherein.

DETAILED DESCRIPTION OF THE INVENTION

Figure 1:
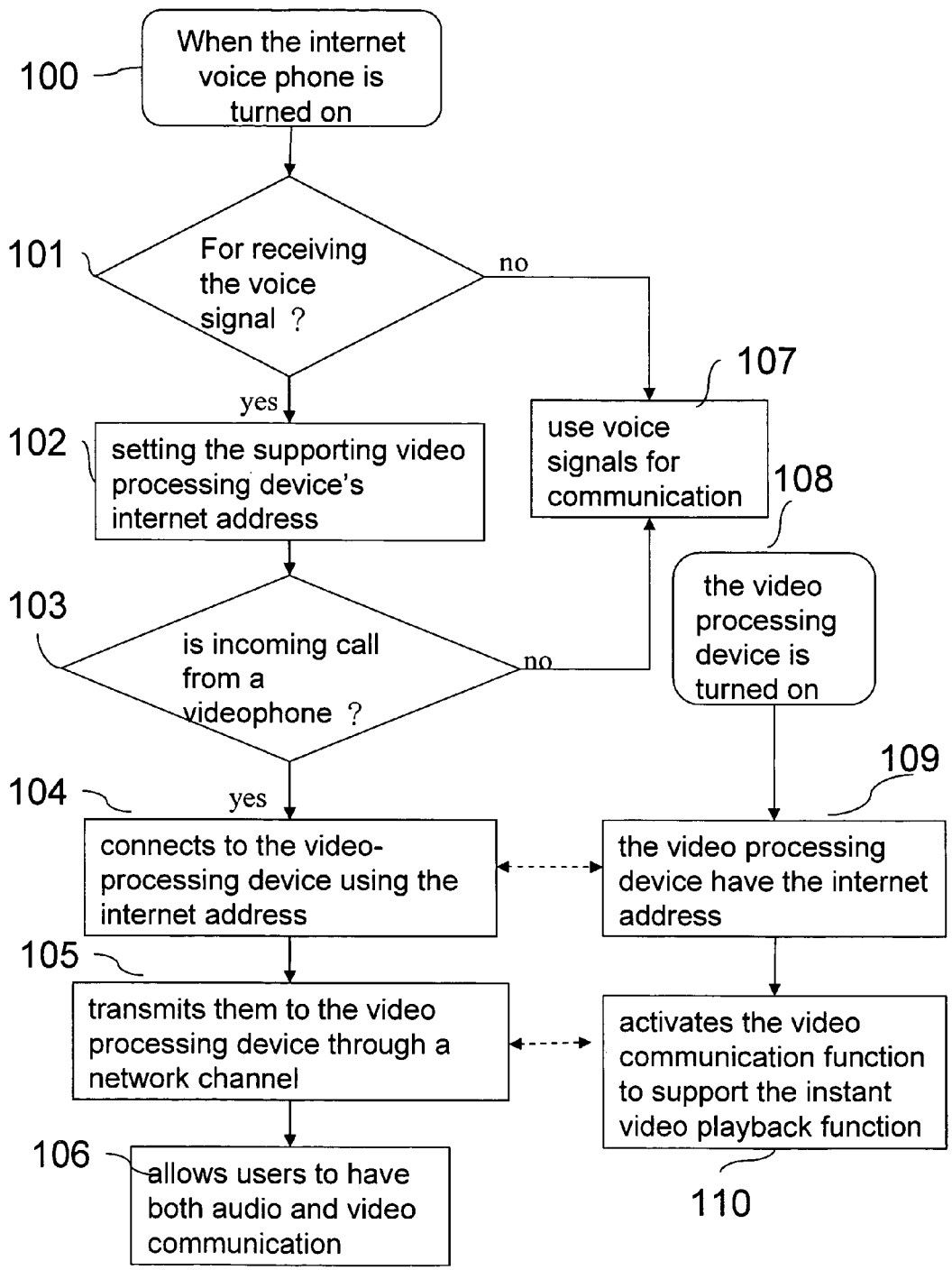
FIG. 1 illustrates, in the floating block diagram, the IP phone with additional video function display.

As shown in FIG. 1, the flowing block diagram of the additional video display function to the internet voice phone includes both the internet voice phone and the video processing device. The communication method is described in contrast with FIG. 1. When the internet voice phone is turned on (step 100), the telephone control module has the settings according to the telephone functions, and verifies if the video image supporting format is entered. The telephone function condition is set by the user, and it can be selected to receive both video and voice signals, or only receive the voice signal (step 101). If the telephone setting is set to support video communication, then the internet voice phone enters the video supporting format, and supports the related video communication protocol and compression format, such as the standard compression format H.261, H. 263, set by the International Telecommunication Union (ITU), or the video compression standards, such as MPEG4, set for multimedia applications by the MPEG (Moving Pictures Export Group) within the International Standard Organization (ISO). The user also has to enter the supporting video processing device's internet address and URL, by entering the URL and bringing out the corresponding IP address (step 102). After verifying if the supporting video processing unit supports the receiving of video signal, as a phone call is incoming (when receiving communication signals), the telephone control module verifies if video signals are received according to the communication signal. Further, the control module determines if the incoming call is from a videophone (step 103). If video signals exist, then it connects via the network to the video-processing device using the URL and an internet address in the setting (step 104). The video processing device needs to first activate video communication functions to support instant real time playback, then the IP phone packages the received video signal and transmits them to the video processing device through a network channel (step 105). After the video-processing device has decompressed the video signal, it is played on the video-processing unit. The received video and audio signals are played by the IP phone directly. The video-processing unit receives the play back video signal from the video recording device, it first passes the compression/decompressing module to be decompressed first, and after that transmitted to the internet voice phone. The telephone control module combines the playback video and playback audio signals and transmits them to the receiving terminal of the communication system, which allows the user to have bidirectional audio and video communication (step 106). The compression/decompression module can support the related video communication protocol and compression format, such as ITU H.261, H.263 format or MPEG 4 format. If it was determined that the internet voice phone does not enter the video supporting format, or it did not receive video signals, or the video device was not initialized, the telephone control module controls the internet voice phone to only use voice signals for communication (step 107). Also, the video processing device needs to be turned on before the process (step 108), and first set the internet address and URL to allow internal network or network connection identification (step 109). An internet phone can use the internet address or URL to verify the location of the video processing device on the network and transmit video signal to it. After the setting is completed, when receiving a video signal, the video processing device activates the video communication function to support the instant video playback function, so the video signal can be played by the video processing device (step 110).

Figure 2:
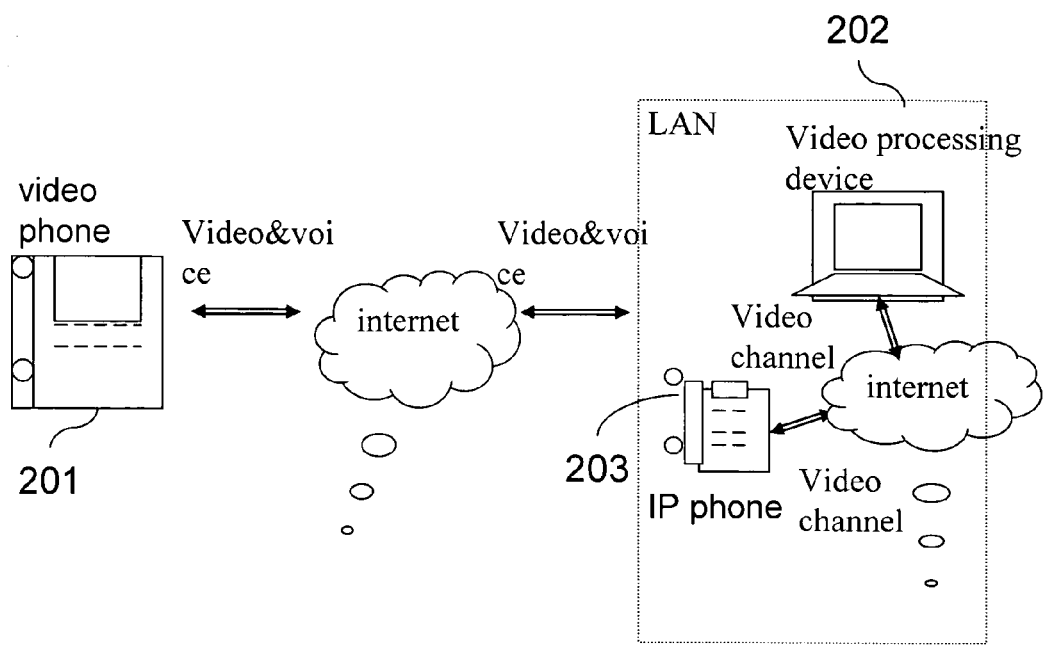
FIG. 2 illustrates the structure of the video communication system of the invention; the IP phone transmits through a wired area network and communicates with video processing device.

As shown in FIG. 2, which illustrates the structure of the video communication system, the IP phone transmits, using a wired local area network to connect with the video processing device for video communication. The IP phone 203 in FIG. 2 uses the network to transmit and receive communication signals from a video phone 201. The communication signal can be divided into two parts, video and voice. When the package voice and video signals are transmitted via the network to the IP phone 203, which is the same as when the IP phone 203's telephone control module (not shown in the picture) receives the communication signals, it verifies if video signal is received according to its own communication settings. For example, it checks if the setting allows simultaneous receiving of the voice signal and video signal according to the video related transmitting protocol. If it is verified that the setting allows the receiving of related video protocol, it uses the IP address of the video processing device 202 in the setting to find the condition of the video processing device 202. If the condition of the device is normal and the device has been initialized, the packaged video signal is transmitted using the internal network's video transmission channel to the video processing device 202. The video processing device 202 decompresses the video signal and plays it with the instant video playback software. The control module in the video-processing unit 202 receives the playback video signal from the image-recording device (such as a recorder). After having compressed the data and having packaged them, it uses the network image transmission channel to transmit the data to the IP phone 203, and the IP phone 203 transmits the packaged data through the network to the video phone 201. The video-processing device 202 includes a device that can process a video signal and also play the video signal. This device can be connected using a wired network to provide data transmission, such as computer systems, etc.

Figure 3:
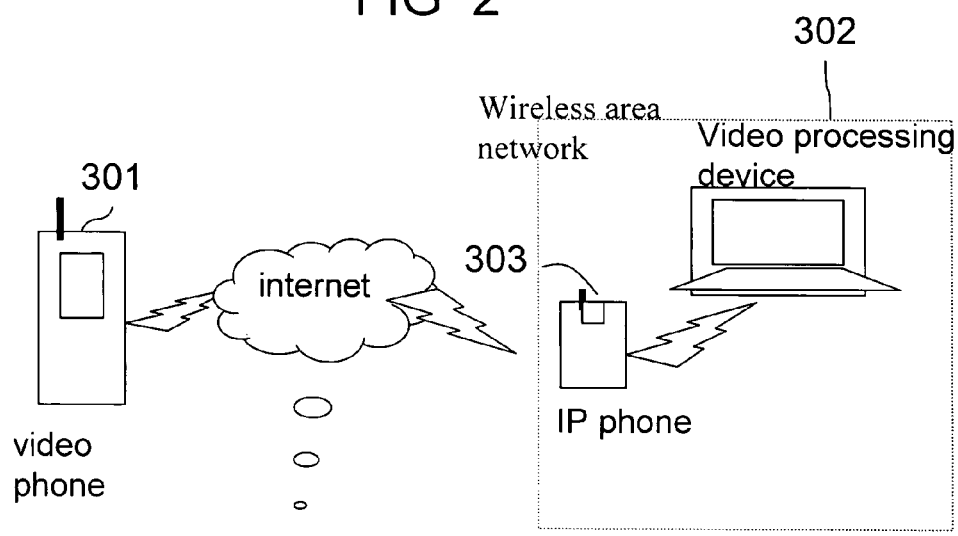
FIG. 3 illustrates the structure of the video communication system of the invention; the IP phone transmits through a wireless area network and communicates with a video processing device.

As shown in FIG. 3, which illustrates the structure of a video communication system of the invention, the IP phone uses a wireless network to transmit to the video processing device for video processing. The IP phone 303 in FIG. 3 uses the network to receive the communication signals from the video phone 301. The communication signal can be divided into two parts, video and voice. When the packaged voice signal and video signals are transmitted via the network to the IP phone 303, which is the same as when the IP phone 303's telephone control module (not shown in the picture) receives the communication signals, it verifies if it is able to receive video signals according to its won communication settings, which is the communication setting of the phone. If it is verified that the setting allows the receiving of related video protocol, it can start to simultaneously receive voice and video signals. It uses the IP address of the video processing device 302 in the setting to find the condition of the video processing device 302. If the condition of the device is normal, and the device has been initialized, the packaged video signal is transmitted using the internal wireless network to the video processing device 302. By using the video processing device 302 to decompress the video signal and play it using instant playback software, the control module of the video processing device 302 receives the playback video signal from the image recording device (such as a recorder). After the data are compressed and packaged, it uses a wireless network's data transmitting channel to transmit to the IP phone 303. Finally, the IP phone 303 uses a wireless network to transmit to the video phone 301. The received playback voice data by the IP phone 303 can be directly transmitted through the network to the video phone terminal. The video processing device 302 comprises of a device that is capable of processing a video signal and play video signals; this device can be connected using a wireless network for data transmission, such as computer systems or PDA or cell phones. The IP phone 303 can be a wired IP phone, wireless IP phone, or cell phone.

Figure 4:
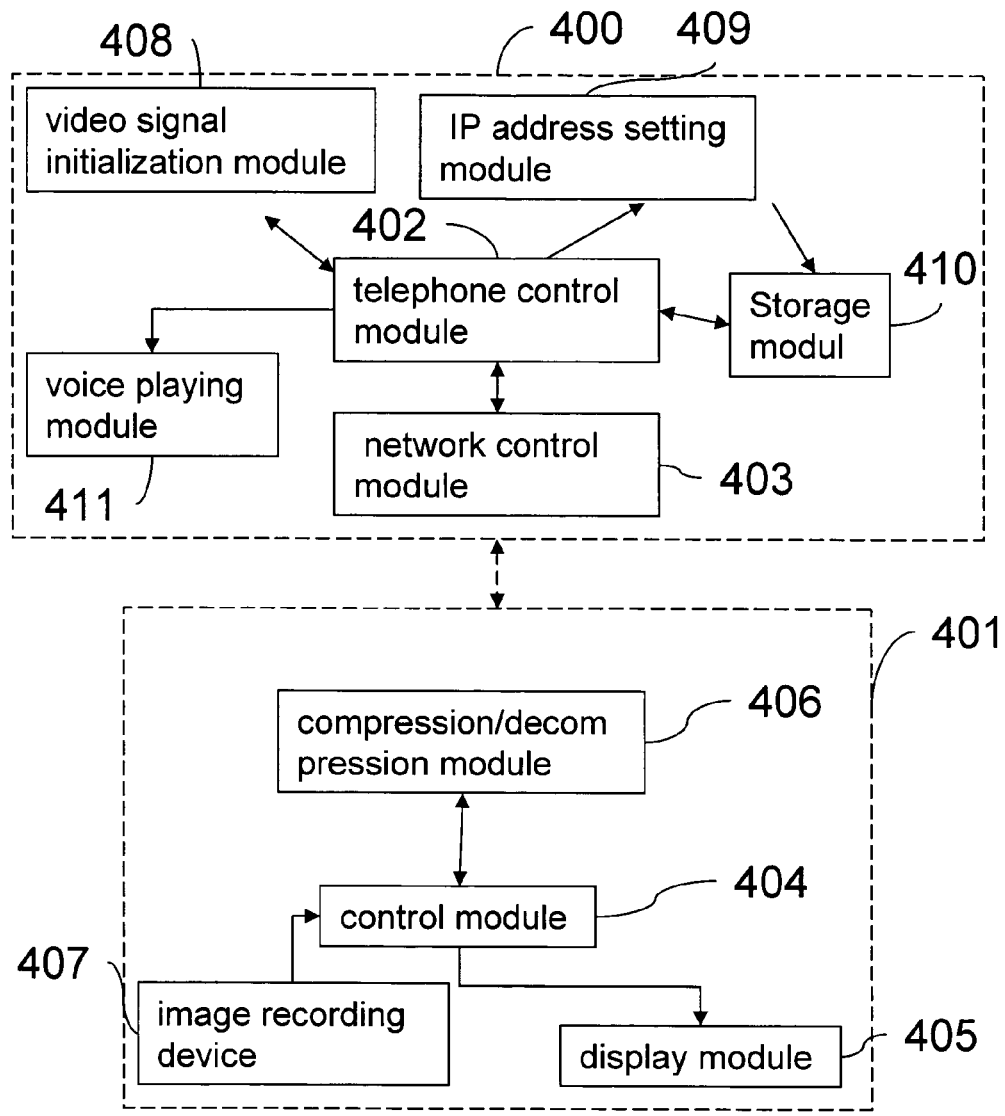
FIG. 4 illustrates the structure of the video communication system of the invention, it comprises of the internal structure of the IP phone and the internal structure of the video processing device connected to the same network.

FIG. 4 shows the structure of the video communication system of the invention, having the internal structure of the IP phone, and the internal structure of the network connected video processing device. The IP phone 400 includes, a telephone control module 402, a network control module 403, a video signal initialization module 408, an IP address setting module 409, a storage module 410, and a voice playing module 411. The video processing device 401 comprises of a control module 404, a display module 405, a compression/decompression module 406, and an image recording device 407.

The following describes the video communication method using the illustration of every module in the IP phone and video processing device, of FIG. 4. First, the telephone control module 402 receives the IP addresses of the communication terminal and the video processing device 401; it controls the IP address setting module 409 to store these two addresses in the storage module 410. When an IP phone 400 uses the network to transmit data, it can control the network control module 403 to use the IP address setting in the storage module 410 for network data transmission. The telephone control module 402 is also used to control the communication setting of the IP phone 400 to use the communication setting to determine the receivable communication format by the IP phone 400. The communication settings include two models, one is receiving voice signals only, and the other is simultaneously receiving the video and voice signal, that is, if it can receive the video-related protocol, like H.261, H.263 or MPEG4 format signals. When the telephone control module 402 receives the video initialization signal, it controls the video signal initialization module 408 using a video-related protocol to initialize and receive video transmission. After having determined the IP phone 400's condition, it can more appropriately to process the incoming call signals, for example, when the video phone produces a call, the signals include voice and video signal. After the voice signals are transmitted to the telephone control module 402, the telephone control module 402 controls the voice playing module 411 to process and output the voice signal. Through the network control module 403 and the IP address data storage module 410, the telephone control module 402 can control the local area network transmission to determine the condition of the video processing device 401. After having determined the condition, it can then decide if it will transmit the video signal to the video processing device 401 for video processing. The condition of the video processing device 401 shows if the device has been initialized and the preparations for receiving video signals has been completed. After having determined the condition of the video processing device 401, the telephone control module 402 controls the network control module 403 using the local area network to transmit the video signal to the video processing device 401; the control module 404 of the video processing device 401 controls the compression/decompression module 406 to decompress the data, and transmits them to the display module 405 for playing. The image recording device 407 of the video processing device 401 captures images, it transmits the video signal to the control module 404, and the control module 404 transmits the received video signal to the compression/decompression module 406. The compression/decompression module 406 compresses the data according to the video communication related protocol, such as H.261, H.263, or MPEG4 formats and produces the video signal to transmit back. This format is the same as the compression format coming from the communication terminal. Control module 404 transmits the transmitted back video signal through the local area network to the IP phone 400's telephone control module 402. The telephone control module 402 combines the transmitted back signal with the transmitted back voice signal, through the control network transmission by the network control module 403 to the other communication terminal. The video-processing device comprises of a device capable of processing and playing the video signal. This device can use wired or wireless network connection for data transmission, such as a computer system, palm pilot, or cell phone, and the communication terminal. The IP phone 400 can be a wired IP phone or wireless internet cell phone.

The invention being thus described, it will be obvious that the same may be varied in many ways. Such variations are not to be regarded as a departure from the spirit and scope of the invention, and all such modifications as would be obvious to one skilled in the art are intermingled to be included within the scope of the following claims.

What is claimed is:

1. A video communication method applicable to an IP phone, wherein said IP phone connects to a communication terminal through an external network, and connects to a video processing device through a local area network, the method comprising the steps of:

retrieving an internet address of the video processing device;

transmitting a communication from the communication terminal to the IP phone, wherein said communication comprises a voice signal and a video signal;

broadcasting the voice signal, and transmitting the video signal through the local area network to the video processing device according to said internet address of said video processing; and processing said video signal using said video signal processing device, and playing said video signal on said video processing device.

2. The method of claim 1, further comprising a step of receiving the video processing device's internet address before retrieving the internet address of the video processing device.

3. The method of claim 1, further comprising a step of receiving an initializing video signal to initialize said IP phone to receive said receiving an initializing video signal to initialize said IP phone to receive said video signal transmitted using a video communication related protocol before retrieving the internet address of the video processing device.

4. The method of claim 1, further comprising a step of determining an initialization of said video processing device via said local area network before the step of transmitting the video signal.

5. The method of claim 1, wherein said step of processing comprising using a compression/decompression module of said video processing device to decompress said video signal to display said video signal on said video processing device.

6. The method of claim 1, wherein said step of transmitting the video signal comprises transmitting the video signal through a wired local area network to said video processing device.

7. The method of claim 1, wherein said step of transmitting the video signal comprises transmitting the video signal to said video processing device through a wireless local area network.

8. A video signal transmitting system with an IP phone and a video processing device, said IP phone connecting to said video processing device through a local area network, the system comprising:
- a voice playing module;
- a telephone control module receiving in combination a voice signal and a video signal, from a communication terminal, the voice playing module receiving the voice signal for play thereon from the telephone control module; the telephone control module configured to control transmission of the video signal through the local area network to said video processing device for display thereby, the telephone control module further controlling receipt of a transmitting back voice signal and a transmitting back video signal from the voice playing module and video processing device, respectively, and combining the transmitting back video signal and the transmitting back voice signal to transmit to said communication terminal;
- an internet address setting module, configured to retrieve a first internet address of the video processing device and a second internet address of the communication terminal from said telephone control module, and to store the first and second internet addresses in a storage module;
- a network control module, configured to control the communication between said IP phone and said communication terminal, and a communication between said IP phone and said video processing device according to the first and second internet addresses; and
- a video signal initialization module, configured to receive an initialization signal from said telephone control module, and to initialize to receive said video signal transmitted by video transmission related protocol.

9. The video signal transmitting system as described in claim 8, wherein said communication terminal is a video IP phone.

10. The video signal transmitting system as described in claim 8, wherein said communication terminal is a mobile IP phone.

11. The video signal transmitting system as described in claim 8, wherein said communication terminal is an IP phone able to process video communication.

12. The video signal transmitting system as described in claim 8, wherein said local area network is a wired local area network.

13. The video signal transmitting system as described in claim 8, wherein said local area network is a wireless local area network.

14. The video signal transmitting system as described in claim 8, wherein said video processing device comprises:
- a display module;
- a compression/decompression module configured to compress and decompress the video signal received by the video processing device from the IP phone; and
- a video control module, configured to control receipt of communications including the video signal from, and transmission of communications, including the transmitting back video signal to said IP phone via said local area network, to control the compression and decompression of said video signal by said compression/decompression device, and to control display of the decompressed video signal on said display module, the compression of the video signal by said compression/decompression module, producing the transmitting back video signal for transmission to said IP phone under the control of the video control module.

15. The video signal transmitting system as described in claim 14, further comprising a video recording device, used to retrieve a video signal and transmit said video signal to said control module, through which said transmitting back video signal is generated to transmit back through said local area network to said IP phone.

16. The video signal transmitting system as described in claim 14, wherein said video processing device is a desktop computer with a screen.

17. The video signal transmitting system as described in claim 14, wherein said computer system is a notebook computer.

18. The video signal transmitting system as described in claim 14, wherein said computer system is a personal digital assistant.

* * * * *